United States Patent [19]

Beauger et al.

[11] Patent Number: 4,769,354
[45] Date of Patent: Sep. 6, 1988

[54] TYPE I DIELECTRIC COMPOSITION BASED ON NEODYMIUM TITANATE

[75] Inventors: Alain Beauger; Claude J. Schneider, both of Dijon; Alain Rossello, Fontaine-les-Dijon, all of France

[73] Assignee: Compagnie Europeene de Composants Electroniques LCC, Courbevoie, France

[21] Appl. No.: 101,781

[22] Filed: Sep. 28, 1987

[30] Foreign Application Priority Data

Sep. 26, 1986 [FR] France ................................. 86 13484

[51] Int. Cl.$^4$ .................... C04B 35/46; C04B 35/49
[52] U.S. Cl. ..................................... 501/138; 501/139
[58] Field of Search ................................ 501/134–139, 501/152; 252/520, 521, 62.9

[56] References Cited

U.S. PATENT DOCUMENTS 4,394,456  7/1983  Sakabe et al. ..................... 501/138
4,704,657  11/1987  Yokoe et al. ...................... 361/321

Primary Examiner—Mark L. Bell
Assistant Examiner—Ann M. Knab
Attorney, Agent, or Firm—Oblon, Fisher, Spivak, McClelland & Maier

[57] ABSTRACT

A type I dielectric composition based on neodymium titanate is formed of a mixture comprising 58% to 78% by weight of neodymium titanate ($Nd_2O_3$-$3TiO_2$), 10 to 21% by weight of lead titanate ($PbTiO_3$), 5% to 14% by weight of barium titanate ($BaTiO_3$), 4% to 15% by weight of barium zirconate ($BaZrO_3$) and 0.2% to 1.2% by weight of yttrium oxide ($Y_2O_3$).

4 Claims, No Drawings

TYPE I DIELECTRIC COMPOSITION BASED ON NEODYMIUM TITANATE

BACKGROUND OF THE INVENTION

The present invention pertains to type I dielectric compositions that frit at high temperatures, especially type I dielectric compositions based on neodymium titanate.

Dielectric compositions having useful properties for making capacitors have been classified according to various criteria such as their temperature coefficient (defined as the product of the relative variation of capacitance and the converse of the temperature variation

and their dielectric constant. Thus type I dielectric compositions are those that have a low dielectric constant, ranging notably between 10 and 90.

Prior art type I dielectric compositions notably exhibit a dielectric constant temperature coefficient which is practically zero within very wide range of temperatures. They also display very low dielectrical losses (generally smaller than $6.10^{-4}$) at high frequences of greater than 1 MHz and over a very wide range of temperature between $-55$ degrees C. and $+125$ degrees C., when materials such as lead titanate and neodymium titanate. This type of composition is generally used to make either disk-shaped or multi-layered ceramic capacitors. Now, multi-layered ceramic capacitors are generally made by casting or shaping layers of dielectric, depositing conductive metallic electrodes on the insulating layers, stacking the resultant elements to form a multi-layered capacitor and fritting the material at a high temperature to densify it and form a solid structure.

Multi-layered ceramic capacitors have various applications and the specialist knows that the presence of bismuth in a type I dielectric ceramic composition does not enable capacitors of this type to be used at high frequencies. It is therefore indispensable to eliminate the bismuth from any type I dielectric composition. Bismuth, however, has the advantage of reducing the fritting temperatures of a ceramic.

An object of the present invention, therefore, is to remove these disadvantages by proposing a new type I dielectric composition which frits at high temperatures, this composition being chosen from the following diagram:

$Nd_2O_3.3TiO_2\text{-}PbTiO_3\text{-}BaTiO_3\text{-}BaZrO_3$ while at the same time preserving the performances of capacitors that use type I dielectric compositions. For a frequency of 1 MHz, these performances are the following:

Dielectric constant ranging from 75 to 85,
Dielectric loss factors of 4 to $8\times10^{-4}$ which are stable at high frequency,
A temperature coefficient α varying from 0 to $\pm30$ ppm corresponding to the NPO class.

SUMMARY OF THE INVENTION

An object of the present invention is therefore a type I dielectric composition based on neodymium titanate, formed of a mixture comprising 58% to 70% by weight of neodymium titanate, 10% to 21% by weight of lead titanate, 5% to 14% by weight of barium titanate, 4% to 15% by weight of barium zirconate and 0.2% to 1.2% by weight of yttrium oxide.

DESCRIPTION OF THE PREFERRED EMBODIMENTS

These dielectric ceramic compositions are stable under temperature (variations of 0 to $\pm30$ ppm) and result in high dielectric constants associated with low dielectric loss factors. The fritting temperatures of compositions of this type range between 1280° C. and 1300° C., and this fact enables the use of palladium-silver alloy electrodes (containing 70% by weight of palladium to 30% by weight of silver) when making multi-layered ceramic capacitors.

The ceramic compositions are prepared according to the method, well-known to the specialist, of weighing and mixing raw materials in order to obtain a sufficiently homogeneous mixture, providing for complete reaction of the elements during fritting.

The present invention will be better understood from the following examples which do not exhaust the possibilities of the invention.

EXAMPLE I

We shall give a detailed description of the preparation of a special composition, and it is understood that the compositions described subsequently would be made in an identical way. This first composition will be designated A. The raw materials used are commonly employed in manufacturing and have not been chosen specially for application to a type I dielectric composition.

The following materials are mixed in polyethylene containers: 200 grams of zircon balls, 100 cm3 of de-ionized water and a quantity, ranging between 50 and 60 g., of a powder with the following composition (the percentages are with reference to the total weight of the powder):

Neodymium titanate $Nd_2O_3.3TiO_2$: 64.08%
Lead titanate $PbTiO_3$: 11.65%
Barium titanate $BaTiO_3$: 12.62%
Barium zirconate $BaZrO_3$: 10.68%
Yttrium oxide $Y_2O_3$: 0.97%

All the constituent elements are mixed for two hours. The suspension obtained is dried after incorporation of a binder, and the powder is sifted. Disks 1 mm thick with a diameter of 8.4 mm. are pressed. The fritting is done in a furnace wih an oxidizing atmosphere at temperatures ranging from 1280° to 1300° C. After silver electrodes have been deposited on both sides, the capacitors are tested electrically.

Table I gives the following values: the density d of the ceramic, the dielectric constant ε, measured at 20° C. and at 1 MHz, the dielectric loss factor tg δ measured at 20° C. and 1 MHz, the temperature coefficient α and the loss factor for frequencies of 1 kHz and 100 Hz.

It can be seen that the dielectric according to the invention as well as the capacitors made from this dielectric possess good qualities and correspond, in particular, to an NPO class.

EXAMPLE II

Six mixtures, the proportions by weight of which are given in the table II, are prepared under the same conditions as above.

Table III shows the electrical characteristics B to G. These characteristics are measured under the same conditions as above.

The variations of the coefficient α shown in table III are mainly due to the variation in the neodymium titanate content. By acting on the neodymium titanate content, the temperature coefficient α can be adjusted zero. The compositions E, F and G are especially useful at this coefficient.

EXAMPLE III

Three mixtures, the proportions by weight of which are given in table IV, are prepared under the same conditions as above. The main characteristic of this table is the variation in the barium zirconate content.

Table V shows the electrical characteristics of the compositions H, I and J. These characteristics are measured under the same conditions as above.

The variations of the temperature coefficient α shown in the table V are mainly due to the variation of the barium zirconate content.

EXAMPLE IV

Three mixtures, the proportions by weight of which are given in the table IV, are prepared under the same conditions as above. The main characteristic of this table is the variation in the lead titanate and barium titanate content.

Table VII shows the electrical characteristics of the compositions K, L and M. These characteristics are measured under the same conditions as above.

According to the various examples cited and on the basis of the variations in electrical characteristics depending on variations in the proportions of the constituent elements, we can choose compositions comprising the following by weight:

58% to 70% of neodymium titanate,
10% to 21% of lead titanate,
5% to 14% of barium titanate,
4% to 15% of barium zirconate,
0.2% to 1.2% of yttrium oxides.

A composition with a barium zirconate content of about 10.7% by weight (see composition A) is especially useful. An yttrium oxide content of about 0.97% by weight would seem to be the best choice.

TABLE I

| | | |
|---|---|---|
| d | | 5,49 |
| ε | | 77,6 |
| tg δ | at 1 MHz | $4 \times 10^{-4}$ |
| α | | $-4$ |
| tg δ | at 1 kHz | $12 \times 10^{-4}$ |
| | at 100 Hz | $10 \times 10^{-4}$ |

TABLE II

| Composition | B | C | D | E | F | G |
|---|---|---|---|---|---|---|
| PbTiO$_3$ | 17,977 | 17,20 | 16,495 | 15,84 | 15,236 | 14,679 |
| BaTiO$_3$ | 10,112 | 9,677 | 9,278 | 8,91 | 8,57 | 8,257 |
| BaZrO$_3$ | 12,359 | 11,828 | 11,34 | 10,891 | 10,48 | 10,092 |
| Nd$_2$O$_3$—3TiO$_2$ | 58,427 | 60,215 | 61,85 | 63,366 | 64,762 | 60,055 |
| Y$_2$O$_3$ | 1,125 | 1,08 | 1,037 | 0,993 | 0,952 | 0,917 |

TABLE III

| Composition | B | C | D | E | F | G |
|---|---|---|---|---|---|---|
| ε | 77,6 | 74,5 | 76 | 76,3 | 75 | 74,3 |
| tg δ at 1 MHz ($10^{-4}$) | 5 | 5 | 4 | 4 | 6 | 5 |
| α | $-54$ | $-37$ | $-25$ | $-4$ | $+4$ | $+8$ |
| tg δ at 1 kHz at 100 Hz ($10^{-4}$) | 9 0 | 10 10 | 9 0 | 9 0 | 10 10 | 9 0 |

TABLE IV

| Composition | H | I | J |
|---|---|---|---|
| PbTiO$_3$ | 11,881 | 12,12 | 12,373 |
| BaZrO$_3$ | 14,851 | 13,13 | 11,34 |
| BaTiO$_3$ | 12,871 | 12,13 | 13,402 |
| Y$_2$O$_3$ | 0,991 | 1,014 | 1,03 |
| Nd$_2$O$_3$—3TiO$_2$ | 59,406 | 60,606 | 61,855 |

TABLE V

| Composition | H | I | J |
|---|---|---|---|
| ε | 74 | 73 | 77 |
| tg δ at 1 MHz ($10^{-4}$) | 5 | 5 | 4 |
| α | $-95$ | $-77$ | $-53$ |

TABLE VI

| Composition | K | L | M |
|---|---|---|---|
| PbTiO$_3$ | 12,368 | 16,5 | 20,62 |
| BaTiO$_3$ | 13,404 | 9,282 | 5,152 |
| BaZrO$_3$ | 11,335 | 11,335 | 11,335 |
| Nd$_2$O$_3$—3TiO$_2$ | 61,86 | 61,85 | 61,86 |
| Y$_2$O$_3$ | 1,033 | 1,033 | 1,033 |

TABLE VII

| Composition | K | L | M |
|---|---|---|---|
| ε | 75 | 75 | 75 |
| tg δ at 1 MHz ($10^{-4}$) | 6 | 4 | 13 |
| α | $-57$ | $-28$ | $+4$ |
| tg δ at 1 kHz at 100 Hz ($10^{-4}$) | 11 10 | 11 10 | 11 10 |

What is claimed is:

1. A dielectric composition formed of a mixture consisting essentially of 58% to 70% by weight of neodymium titanate, 10% to 21% by weight of lead titanate, 5% to 14% by weight of barium titanate, 4% to 15% by weight of barium zirconate and 0.2% to 1.2% by weight of yttrium oxide.

2. A dielectrical composition according to the claim 1, wherein barium zirconate is 10.7% by weight.

3. A dielectrical composition according to the claim 1, wherein yttrium oxide is 0.97% by weight.

4. A dielectrical composition according to the claim 1, wherein barium zirconate is 10.7% by weight and yttrium oxide is 0.97% by weight.

* * * * *